United States Patent [19]

Pocius

[11] Patent Number: 4,913,968
[45] Date of Patent: Apr. 3, 1990

[54] WATER-COMPATIBLE COATING RESIN

[75] Inventor: Alphonsus V. Pocius, St. Paul, Minn.

[73] Assignee: Minnesota Mining and Manufacturing Company, St. Paul, Minn.

[21] Appl. No.: 296,950

[22] Filed: Jan. 17, 1989

Related U.S. Application Data

[62] Division of Ser. No. 906,830, Sep. 12, 1986, Pat. No. 4,822,464.

[51] Int. Cl.[4] .................... B32B 15/08; B32B 27/38; C25D 13/06; C08L 63/00
[52] U.S. Cl. ................................. 428/418; 523/403; 523/406; 523/414; 523/404; 524/901; 156/150; 156/151; 204/181.7
[58] Field of Search ............... 204/181.7, 181.6, 181.4; 525/523, 530; 524/901; 523/400, 402, 403, 406, 414, 404; 156/150, 151; 428/413, 418

[56] References Cited

U.S. PATENT DOCUMENTS

| | | | |
|---|---|---|---|
| 2,444,536 | 5/1946 | Searle | 260/313 |
| 3,477,990 | 12/1967 | Dante et al. | 260/47 |
| 3,663,389 | 4/1970 | Koral et al. | 204/181.7 |
| 3,894,922 | 4/1974 | Bosso et al. | 204/181.7 |
| 3,925,181 | 10/1974 | McGinniss | 204/181.7 |
| 3,935,087 | 12/1974 | Jerabek et al. | 204/181.7 |
| 3,959,105 | 5/1976 | Bosso et al. | 204/181.7 |
| 3,962,165 | 6/1976 | Bosso et al. | 260/29.2 |
| 3,975,250 | 8/1976 | Marchetti et al. | 204/181.7 |
| 4,025,409 | 5/1977 | McGinniss | 204/181.7 |
| 4,029,561 | 6/1977 | McGinniss | 204/181.7 |
| 4,035,272 | 7/1977 | McGinniss | 204/181.7 |
| 4,037,018 | 7/1977 | McGinniss | 428/418 |
| 4,064,090 | 12/1977 | Gibson et al. | 260/29.4 |
| 4,066,523 | 1/1978 | McGinniss | 204/159.15 |
| 4,069,210 | 1/1978 | Schimmel | 260/29.2 |
| 4,094,843 | 6/1978 | McGinniss | 260/29.2 |
| 4,104,147 | 8/1978 | Marchetti et al. | 204/181.7 |
| 4,110,287 | 8/1978 | Bosso et al. | 260/29.2 |
| 4,130,469 | 12/1978 | McGinniss | 204/159.16 |
| 4,134,864 | 1/1979 | Belanger | 260/18 |
| 4,140,816 | 2/1979 | McGinniss | 427/44 |
| 4,148,772 | 4/1979 | Marchetti et al. | 260/29.2 |
| 4,159,233 | 6/1979 | Ting et al. | 204/181.7 |
| 4,198,331 | 4/1980 | Buchwalter et al. | 260/29.2 |
| 4,246,151 | 1/1981 | Dohy et al. | 260/29.2 |
| 4,248,753 | 2/1981 | Buchwalter et al. | 260/29.2 |
| 4,256,560 | 3/1981 | Buchwalter et al. | 204/181.7 |
| 4,260,720 | 4/1981 | Bosso et al. | 528/109 |
| 4,274,989 | 6/1981 | Tominaga et al. | 260/29.2 |
| 4,315,044 | 2/1982 | Elmore et al. | 427/386 |
| 4,339,369 | 7/1982 | Hicks et al. | 523/414 |
| 4,376,848 | 3/1983 | Subramanyam et al. | 525/452 |
| 4,396,732 | 8/1983 | Sekmakas et al. | 523/416 |
| 4,405,427 | 9/1983 | Byrd | 204/181.7 |
| 4,420,574 | 12/1983 | Moriarity et al. | 523/404 |
| 4,467,122 | 8/1984 | Szaboics | 568/727 |
| 4,503,266 | 3/1985 | Szaboics | 568/719 |
| 4,566,963 | 1/1986 | Ott et al. | 204/181.7 |
| 4,593,078 | 6/1986 | Kooymans et al. | 525/497 |
| 4,695,508 | 9/1987 | Kageyama et al. | 428/261 |

OTHER PUBLICATIONS

Beckwith, G. E., "Interfacial Bond Integrity (350° F. Service)", Report No. AFWAL-TR-82-4171 (Jan., 1983).
Diener, S. L., "Exploratory Development of Corrosion Inhibiting Primers", Report No. AFML-TR-77-71 (May, 1977).
Diener, S. L., "Development of Improved Electrodeposited Corrosion Inhibiting Primers", Report No. AFML-TR-79-4073 (Jun., 1978).
Diener, S. L. and Mels, S. J., "Electrodeposited Corrosion Inhibiting Adhesive Primers", Proceedings of the 11th National SAMPE Technical Conference, Azusa, CA., P. 759 (1979).
Jackson, W. J., Jr. and Caldwell, J. R., "Polycarbonates from Three-Dimensional Polycyclic Bisphenols", I&EC Product Research and Development, 2, (4), 246–256 (1963).
Korshak, V. V., Vinogradova, S. V. and Vygodskh, Y. S., "Cardo Polymers", J. Macromol. Sci.-Rev. Macromol. Chem., C11, (1) 45–142 (1974).
Meade, L. E. and McBrayer, T. E., "Manufacturing Technology for Integration of Advanced Repair Bonding Techniques", Report No. IR-466-1(IX) (Jan. 15, 1985).
Morgan, F. W., "Aromatic Polyesters with Large Cross-Planar Substituents", Macromolecules, 3, (5), 536–543 (1970).
RFP No. F33615-86R-5009.
Wismer et al., "Cathodic Electrodeposition", Water-Borne & Higher Solids Coatings Symposium (New Orleans, Feb. 17-19, 1982).
P. B. Kelly et al., "Relationship of Molecular Structure & Resin Performance for a Series of Diglycidyl Ethics", *J. Appl. Polymer Sci.*, VI 22, 425–532 (1962).
A. Eisenberg, "The Glassy State & the Glassy Transition", *Physical Properties of Polymers*, Ch. 2 (1984).
W. Erich et al., "Effect of Molecular Structure on Mechanical Properties of Epoxy Resins", *J. Appl. Polymer Sci., III*, 9, 296–301 (1960).

*Primary Examiner*—John F. Niebling
*Assistant Examiner*—Ben C. Hsing
*Attorney, Agent, or Firm*—Donald M. Sell; Walter N. Kirn; James V. Lilly

[57] ABSTRACT

Water-compatible resins containing a residue of an aryl or cycloalkyl compound having a sufficiently bulky structure to raise the $T_g$ of a specified cured epoxy resin by more than 20° C. The resins preferably are used in cathodic electrophoretically-depositable coating compositions.

18 Claims, No Drawings

WATER-COMPATIBLE COATING RESIN

This is a division of application Ser. No. 906,830 filed Sept. 12, 1986 and now U.S. Pat. No. 4,822,464.

TECHNICAL FIELD

This invention relates to water-compatible coating resins. This invention also relates to electrophoretically depositable coating resins and compositions. In addition, this invention relates to a process for coating articles using water-compatible coating resins and to articles having a coating of such resins thereon.

BACKGROUND ART

Due in part to environmental considerations, current interest in the coating field has shifted from solvent-borne coatings, which have heretofore been used, to water-borne sprayable coatings and to water-based electrodepositable coatings. Electrodepositable coatings, especially cathodic electrophoretically depositable coatings, are of particular interest for high volume applications.

Several electrodepositable primers have been investigated for use on aircraft parts, to prepare such parts for the application of structural bonding adhesives and to inhibit corrosion. These primers include the anodic electrodepositable primers described in U.S. Pat. No. 4,405,427 and the cathodic electrodepositable primers described in Diener, S. L. "Exploratory Development of Corrosion Inhibiting Primers", Report No. AFML-TR-77-71 (May, 1977), Diener, S. L. "Development of Improved Electrodeposited Corrosion Inhibiting Primers", Report No. AFML-TR-79-4073 (June, 1978), Diener, S. L. and Mels, S. J., "Electrodeposited Corrosion Inhibiting Adhesive Primers", Proceedings of the 11th National SAMPE Technical Conference, Azusa, California, page 759 (1979), Beckwith, G. E., "Interfacial Bond Integrity (350° F. Service)", Report No. AFWAL-TR-82-4171 (January, 1983) and Meade, L. E. and McBrayer, T. E., "Manufacturing Technology for Integration of Advanced Repair Bonding Techniques", Report No. IR-466-1(IX) (January 15, 1985).

The anodically-applied primer of the '427 patent would be expected to have only limited corrosion resistance. Adhesive bonds made with the primers of the other references cited above exhibit a loss in shear strength after exposure to elevated temperatures. For example, the best reported primer of the Beckwith reference was a composition identified as "MD-902". Using "AF-143" epoxy film adhesive (3M), this primer provided adhesive bonds that after exposure to 149° C. for only 200 hours exhibited an 18% drop in lap shear strength. In comparison, bonds made using state of the art solvent-borne primers and the same epoxy film adhesive typically exhibit an increase in lap shear strength when exposed to similar conditions, since the cured film adhesive gains strength when first heated.

Improved retention of adhesive strength at temperatures of 149° C. and above and service times of 200 hours and longer is considered desirable, particularly for applications such as the manufacture or repair of aircraft, in order to insure that the bonded assembly will not fail in use. As indicated by the above references and data, current primers do not satisfy this need. In an effort to obtain primers that will satisfy it, the U.S. Air Force recently issued RFP No. F33615-86R-5009 for "Electrodeposited Primer Development".

It should be noted that there are many references relating in general to electrodepositable paints ("ED paints") and paint primers. These references include Wismer et al, "Cathodic Electrodeposition", Water-Borne & Higher Solids Coatings Symposium (New Orleans, Feb. 17-19, 1982) and U.S. Pat. Nos. 3,663,389, 3,935,087, 3,959,106 and 3,962,165. ED paints and paint primers frequently contain a water-compatible (i.e., water-soluble or water-dispersible) resin made by reacting a polyepoxide with a difunctional linking compound. Linking compounds that have been described (but not always referred to as a linking compound) include the glycols or diphenols of U.S. Pat. Nos. 4,104,147, 4,148,772, 4,248,753, 4,315,044 and 4,396,732, the monoprimary-, di- or poly-amines of U.S. Pat. Nos. 3,975,250, 4,064,090, 4,069,210, 4,134,864, 4,159,233, 4,246,151, 4,274,989, and 4,420,574, the hydantoin compounds of U.S. Pat. No. 4,110,287 and the dimercaptans of U.S. Pat. No. 4,260,720.

Several references also describe the use of bismaleimides as crosslinkers for ED paints and paint primers. Among these references are U.S. Pat. Nos. 3,925,181, 4,025,409, 4,029,561, 4,035,272, 4,037,018, 4,130,469 and 4,140,816.

None of the above references describe the water-compatible coating resins of the present invention.

DISCLOSURE OF INVENTION

The present invention provides, in one aspect, a water-compatible resin having a substantially linear structure and water-solubilizing groups (i.e., terminal, pendant or backbone groups that are cationic, anionic, amphoteric or nonionic), the backbone of such resin being derived from reaction between a polyepoxide and an aryl or cycloalkyl linking compound having a bulky, $T_g$-enhancing structure and a plurality of (preferably two) epoxide-reactive groups. The linking compound is sufficiently bulky to raise by more than 20° C. the $T_g$ of a first cured epoxy resin that has been (a) made from the reaction product obtained by combining the diglycidyl ether of bisphenol A ("DGEBA") and said linking compound at a 1.05:1 ratio of moles of said DGEBA to moles of said epoxide-reactive groups in said linking compound, (b) cured using piperidine at a 9.08:1 ratio of moles of epoxy groups in said reaction product to moles of said piperidine and (c) analyzed using dynamic mechanical analysis, when compared to the $T_g$ of a second cured epoxy resin made and cured similarly but using bisphenol A in place of the linking compound.

In a preferred embodiment, the water-compatible resin has a substantially linear structure of the formula:

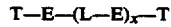
$$T-E-(L-E)_x-T \qquad I$$

wherein:
- each E is independently a residue of a diepoxide;
- each L is independently a residue of an aryl or cycloalkyl compound having the aforementioned bulky structure and an average of two epoxide-reactive groups (preferably independently selected from amine, phenol, mercaptan and carboxyl groups);
- each T is independently a water-solubilizing moiety (e.g., containing one or more cationic water-compatible ammonium, sulfonium or phosphonium groups, anionic acidic groups, amphoteric groups or nonionic polyoxyalkylene groups); and x has a sufficiently low value (e.g., about 1 to about 20) so that said resin will be water-dispersible at a level of at least 1% solids.

In a particularly preferred embodiment, the water-compatible resin is a cathodic electrophoretically-depositable coating resin having a substantially linear structure of the formula:

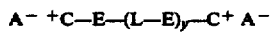

wherein:

E and L are as defined above;

each C is independently a cationic water-compatible ammonium, sulfonium or phosphonium group;

each A is independently the conjugate base of a water-soluble acid HA having a $pK_a$ that is appropriate for use under cathodic electrodeposition conditions; and y has an average value of about 1 to about 20. The water-compatible coating resin of Formula II is particularly useful as a cathodic electrophoretically-depositable structural adhesive bonding primer ("CEDSABP").

The present invention also provides a process for coating an article with such resin, and an article having a coating of such resin thereon.

DETAILED DESCRIPTION

The water-compatible resins of the invention are cationic, anionic, amphoteric or nonionic. When they are cationic, anionic or amphoteric, they preferably are applied by electrodeposition from a bath, although they can be applied by other techniques such as spraying, brushing, dipping or roll-coating. When the coating resins of the invention are nonionic, they are applied by techniques other than electrodeposition.

The water-compatible resins of the invention preferably have terminal water-solubilizing groups, although such groups can be pendant or, if desired, bound within the backbone of the resin. The preferred resins have terminal water-solubilizing groups, and the discussion that follows will deal primarily with such resins. These resins can be synthesized by reacting a polyepoxide with an aromatic or cycloalkyl linking compound having a plurality of epoxide-reactive groups, using a stoichiometric excess of epoxide groups to epoxide-reactive groups, to provide a substantially linear reaction product having terminal epoxide groups. For brevity, this reaction product will sometimes be referred to herein as the "EL" reaction product. The polyepoxide preferably is a diepoxide, and the epoxide-reactive linking compound preferably contains two epoxide-reactive groups. If desired, limited quantities of tri- or higher-functional epoxides (e.g., tetraepoxides) or tri- or higher-functional epoxide-reactive linking compounds (e.g., di(primary)amines) can be combined with the above-described reactants to form the EL reaction product, although this may decrease the linearity and increase the brittleness of cured coatings made from the resulting resin. The EL reaction product is made water-compatible by reacting it with an epoxide-reactive water-compatibilizing compound. For brevity, the reaction product formed by reacting this water-compatibilizing compound with the EL reaction product will sometimes be referred to herein as the "ELT" reaction product.

The water-compatible resins used in the present invention can also be synthesized by other routes, if desired. For example, the various reactants described above can be reacted simultaneously rather than sequentially. It should be understood that the resins obtained from such other routes remain within the scope of the present invention, if they have chemical structures capable of being prepared from reactants of the type described herein.

Suitable polyepoxide reactants (for brevity, such reactants will sometimes be referred to herein as "E precursors") include 1,2-, 1,3-, or 1,4-aromatic diepoxides such as those described in Frisch and Reegan, "Ring-Opening Polymerizations", Vol. 2, Marcel Dekker, Inc. (1969). Particularly useful are mono- or poly-nuclear aromatic diepoxides, for example, phenol-based 1,2-epoxides such as resorcinol diglycidyl ether (e.g., "Kopoxite"), bisphenol-based 1,2-epoxides such as the diglycidyl ether of bisphenol A (e.g., "EPON 828" and "DER 331"), and polynuclear diepoxides such as 2,2-bis[4-(2,3-epoxyproxy)phenyl] norcamphane, 2,2-bis[4-(2,3-epoxypropoxy)phenyl] decahydro-1,4,5,8-dimethanonaphthalene and 9,9-bis[4-(2,3-epoxypropoxy)phenyl]fluorene. Mixtures of aromatic diepoxides can be used if desired.

Cycloaliphatic, heterocyclic or aliphatic diepoxides also can be used as E precursors. However, they are less preferred, and are believed to be less stable against oxidation than aromatic diepoxides. Examples of such less preferred diepoxides include vinylcyclohexene dioxide (e.g., "ERL-4206"), 3,4-epoxycyclohexylmethyl3,4-epoxycyclohexanecarboxylate (e.g., "ERL-4221"), 3,4-epoxy-6-methylcyclohexylmethyl-3,4-epoxy-6-methylcyclohexanecarboxylate (e.g., "ERL-4201"), bis(3,4-epoxy-6-methylcyclohexylmethyl)-adipate (e.g., "ERL-4289"), aliphatic epoxy modified with polypropylene glycol (e.g., "ERL-4050" and "ERL-4052"), dipentene dioxide (e.g., "ERL-4269"), 1,4-butanediol diglycidyl ether (e.g., "Araldite RD-2"), polyglycol diepoxide (e.g., "DER 736"), urethane modified epoxide (e.g., "QX3599"), polyfunctional flexible epoxides (e.g., "Flexibilizer 151"), and mixtures thereof.

The diglycidyl ether of bisphenol A ("DGEBA") is a particularly preferred diepoxide for use in the present invention. This and many other suitable epoxy resins are commercially available, e.g., as listed in Lee and Neville, "Handbook of Epoxy Resins", McGraw-Hill Book Company, New York (1967) and in Bruins, P. F., "Epoxy Resin Technology", John Wiley & Sons, New York (1968).

As noted above, the epoxide-reactive linking compound is an aryl or cycloalkyl compound having a plurality of (preferably two) epoxide-reactive groups and a $T_g$-enhancing bulky structure. For brevity, such linking compounds will sometimes be referred to herein as "L precursors". Based on a comparison to a cured epoxide resin made using bisphenol A in place of the L precursor, cured using piperidine and analyzed using dynamic mechanical analysis as described in more detail below, the L precursor raises the $T_g$ of such cured epoxide resin by more than 20° C. Preferably the L precursor raises the $T_g$ of the cured resin by at least 30° C., and more preferably by at least 50° C. Preferably, the bulky structure of the L precursor is "cross-planar", that is, its ring atoms lie in two or more intersecting planes.

Preferably the epoxide-reactive groups of the L precursor are attached through unsubstituted or substituted arylene radicals (e.g., p-phenylene, naphthalene or other appropriate aromatic radicals) to a ring atom (e.g., a ring carbon atom) in the remainder of the L precursor. Preferred epoxide-reactive groups are selected from amine, phenol, mercaptan, and carboxyl groups, as well as mixtures thereof. For example, the L precursor can be a (primary)arylamine, (primary)cycloalkylamine, di(secondary)alkylarylamine, di(secondary)cycloalkylamine, (secondary)arylaminophenol, aryl or cycloalkyl dimercaptan, aryl or cycloalkyl dicarboxylic acid, or other compound containing a combination of such groups. Preferably, the L precursor is a diamine, e.g., a di(methylaryl)amine), diphenol, or di(arylthiol).

Bulky groups that can be present in the L precursor (and the L moiety of Formulas I and II) include:

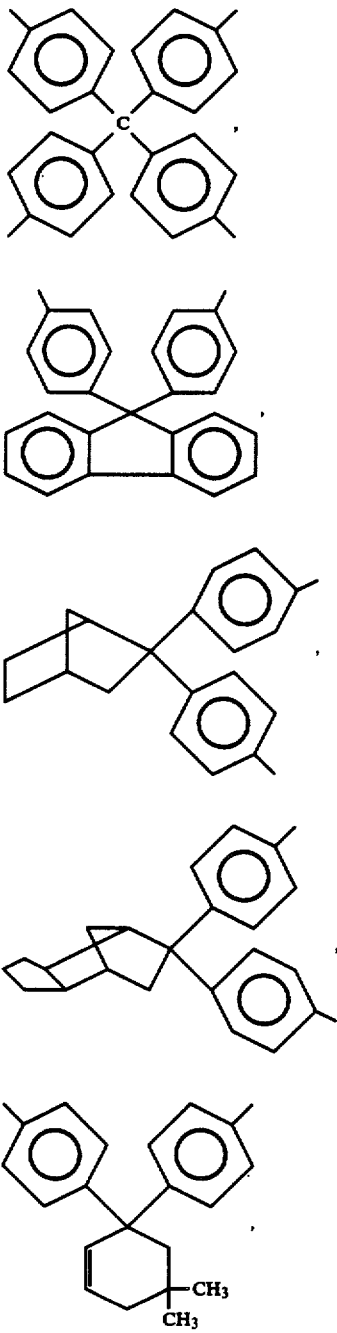

-continued

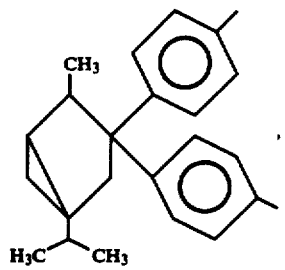

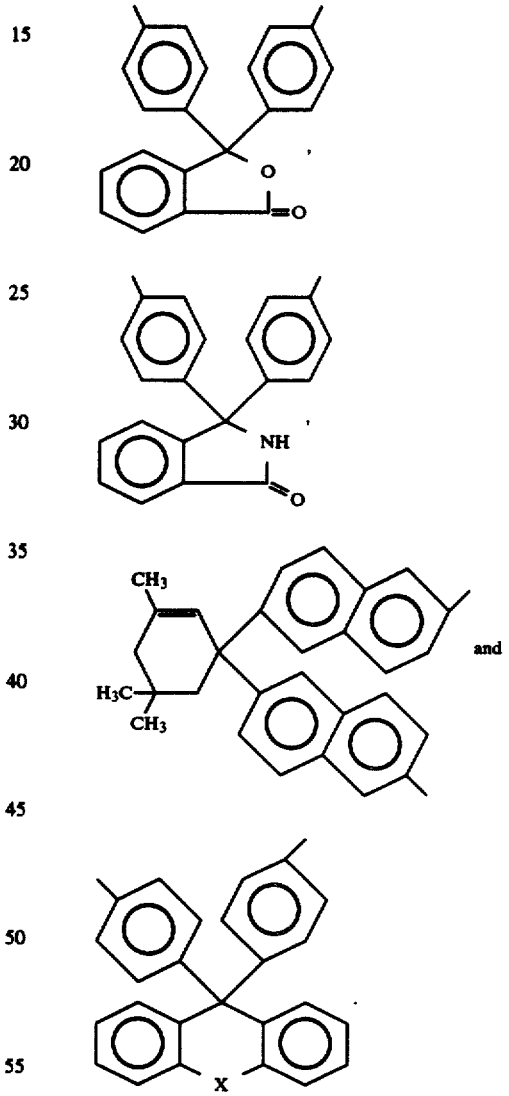

where X is $>CR_2$, $>CR^1$, $>C=O$, $>S$, $>SO$, $>SO_2$, $>O$ or $>NR$ where each R is independently H or a lower ($C_{1-4}$) alkyl or substituted alkyl group, and $R^1$ is a trivalent unsaturated aliphatic radical doubly bonded to said C of $>C=R^1$ and bonded to the 4 or 5 position of the adjacent ring to form a fused ring structure.

Representative L precursors (or bulky groups that can be present therein) are shown in Korshak, V. V., Vinogradova, S. V. and Vygodskh, Y. S., "Cardo Polymers", J. Macromol.Sci.-Rev. Macromol. Chem., C11, (1) 45–142 (1974), jackson, W. J. and Caldwell, J. R., "Polycarbonates from Three-Dimensional Polycyclic Bisphenols", I&EC Product Research and Development, 2, (4), 246–256 (1963), Morgan, F. W., "Aromatic Polyesters with Large Cross-Planar Substituents", Macromolecules, 3(5), 536–543 (1970), and U.S. Pat. Nos. 4,467,122 and 4,503,766.

A preferred class of L precursors is described in the copending application of Schultz, Portelli, and Tane, U.S. Ser. No. 830,552, filed Feb. 18, 1986, the disclosure of which is incorporated herein by reference. A particularly preferred L precursor is 9,9-bis(4-methylaminophenyl)fluorene.

The L precursors can be prepared using conventional methods, e.g., by a condensation reaction. For example, a preferred method for preparing the di(secondary)alkylarylamine 9,9-bis(4-methylaminophenyl)fluorene is to condense two equivalents of N-methyl aniline with one equivalent of fluorene.

The E and L precursors can be reacted with one another under conventional conditions, e.g., by heating and stirring at elevated temperatures, using solvents and/or catalysts where desired to facilitate the reaction. Solvents are especially useful if the EL reaction product would be a solid when prepared neat. For example, when the L precursor is a diphenol, catalysts such as tertiary aromatic amines, triphenylphosphonium iodide salts, triphenylphosphine, and the like can be used, e.g., as shown in U.S. Pat. No. 3,477,990. Preferably, the polyepoxide resin is used in stoichiometric excess, that is, in an amount such that a preponderance of the terminal groups in the EL reaction product are epoxide groups. Preferably at least 2.1 epoxy groups are reacted with each epoxide-reactive group in the L precursor. Decreasing this stoichiometric ratio will tend to increase the value of the subscripts "x" and "y" in Formulas I and II, above, and may tend to diminish storage stability ("bath stability") of the coating resin. Poor bath stability is manifested by the formation of coagulum in the coating bath, or by the formation of mottled or otherwise defective cured coatings.

The EL reaction mixture can also contain acyclic epoxide-reactive compounds, e.g., aliphatic diamines, polyoxyalkylene polyamines, aliphatic glycols or aliphatic dicarboxylic acids. However, use of such compounds may reduce the heat resistance of cured coatings made from the resulting resin.

The substantialy linear EL reaction product has terminal epoxide groups, and can be reacted with the epoxide-reactive precursor to the above-described water-compatibilizing compound. For brevity, such compounds will sometimes be referred to herein as "T precursors". If the T precursor is capable fo forming cationic groups, then for brevity it will sometimes be referred to herein as a "C precursor".

Suitable T precursors are linear or cyclic compounds that contain one or more water-compatibilizing groups, that is, groups that are capable of forming anionic groups, cationic groups, amphoteric groups or nonionic polyoxyalkylene groups. T precursors that can be used to form the less-preferred anionic or nonionic coating resins of the invention include epoxide-reactive acids (e.g., dicarboxylic acids) and epoxide-reactive compounds containing polyoxyalkylene groups (e.g., polyoxyalkylene glycols).

Preferred T precursors are those C precursors capable of forming an ammonium, sulfonium or phosphonium cation when reacted with an epoxide and an acid. Representative preferred C precursors are described in U.S. Pat. Nos. 3,925,181, 3,935,087, 4,064,090, 4,339,369 and 4,405,427. Particularly preferred C precursors include alkyl amines such as diethylamine and diethanolamine, cyclic amines such as pyrrolidine and morpholine, organic sulfur compounds such as thiodiethanol and diethyl sulfide and organic phosphorus compounds such as triethylphosphine. The preferred cathodic electrophoretically-depositable coating resins of formula II have been found to provide the highest "throwpower" (ability to penetrate deep recesses in parts to be coated) when the C precursor is an amine, and to provide the longest bath stability when the C precursor is an organic sulfur compound. Thus it is believed that a desirable balance of throwpower and bath stability will be obtained when a mixture of amine compounds and organic sulfur compounds are used as C precursors, in order to form an ELT reaction product containing a mixture of terminal amino and organosulfur groups, and thence to form a final reaction product having a mixture of terminal ammonium and sulfonium groups.

Preferably the T or C precursor is reacted with the EL reaction product in approximate stoichiometric equivalence. EL reaction products prepared from an amine L precursor may contain some epoxy homopolymer, and thus it is desirable to measure (rather than calculate) the epoxide equivalent weight of the EL reaction product in order to determine the amount of T or C precursor to be employed. This analysis can be carried out, for example, by reacting a sample of the EL reaction product with excess HCl in pyridine and then titrating the remaining HCl with sodium methoxide, or by titrating a sample of the EL reaction product with tetrabutylammonium iodide and perchloric acid. The pyridine-HCl procedure is preferred for use with EL reaction products derived from amine L precursors.

When the T precursor is capable of forming an anionic water-solubilizing group, the ELT reaction product typically is dissolved or dispersed in water by salting it with a base. Suitable bases include ammonia, alkyl amines, hydroxides and carbonates. When the T precursor forms an amphoteric or nonionic water-solubilizing group, the ELT reaction product typically can be dissolved or dispersed in water without further modification. When the T precursor is a C precursor capable of forming a cationic water-solubilizing group, the ELT reaction product typically is dissolved or dispersed in water by salting it with an acid. Suitable acids are described in U.S. Pat. Nos. 3,925,181, 3,935,087, 4,064,090 and 4,339,369. Preferred acids are carboxylic acids such as formic acid, carbonic acid, acetic acid, oxalic acid, lactic acid, succinic acid, maleic acid, malic acid, citric acid, gallic acid and mixtures thereof. Other acids that render the ELT reaction product water-compatible but are not so strong that they cause its decomposition can also be used, such as phosphoric acid and arylsulfonic acids.

The resulting water-compatible coating resin is combined with additional ingredients of the type customarily used in ED paints. For example, most ED paints contain crosslinking agents to provide a durable (e.g., solvent-resistant or scratch-resistant) cured film. The crosslinking agent should be capable of crosslinking the coating resin, while remaining stable against coagulation when the coating resin is stored in aqueous solution. Representative crosslinking agents (referred to herein as "crosslinking film-formers") are described in U.S. Pat. Nos. 3,925,181 and 4,248,753, and include bis-maleimides, methoxylated ureas (aminoplasts), phenol-formaldehyde adducts (phenolplasts), and blocked isocyanates. If the crosslinking film-former requires the presence of an appropriate functional group on the coating resin (e.g., an active hydrogen atom in instances in which a blocked isocyanate is used), then care should be taken to provide such functional group when formulating the coating resin.

The preferred cathodic electrophoretically-depositable coating resins of formula II exhibit particularly good heat resistance when they are crosslinked using bis-maleimide crosslinking film-formers. Suitable bis-maleimides are described in U.S. Pat. Nos. 3,925,181, 4,025,409, 4,029,561, 4,035,272, 4,037,018, 4,066,523, 4,094,843, 4,130,469, and 4,140,816. In general, these patents employ a Michael addition reaction, and to enable crosslinking to occur they require the presence of mercaptan groups, primary or secondary amino groups, formation of a primary or secondary amino group after electrodeposition, or the presence of an ultraviolet (UV) photosensitizer and the use of a UV cure cycle. While these approaches can be used to crosslink the coating resins of the present invention, it has also been found that bis-maleimide crosslinking will take place in the absence of mercaptan groups, primary or secondary amino groups, or UV photosensitizers or UV cure cycles as long as the coating resin contains a tertiary nitrogen atom. Coating compositions employing such crosslinking are described in copending U.S. patent application Ser. No. 906,795, "Water-Compatible Coating Composition", filed of even date herewith in the names of Thomas H. Wilson, Jr. and Alphonsus V. Pocius. The disclosure of that application is incorporated herein by reference. When only tertiary nitrogen atoms are present, crosslinking apparently does not occur via a Michael addition reaction, and seems to occur at lower temperatures than required by the patents set forth above. Low cure temperatures are especially useful when coating aluminum substrates. Aluminum is not especially heat resistant, and its physical properties can be degraded by exposure to the cure cycles customarily employed when crosslinking ED paints containing bis-maleimides.

Suitable bis-maleimides can be made using conventional methods, e.g. by reaction of maleic anhydride and a di(primary)amine as described in U.S. Pat. No. 2,444,536. Since most bis-maleimides are insoluble in water and common organic solvents, they usually are employed in particulate form.

Preferred bis-maleimides have the formula:

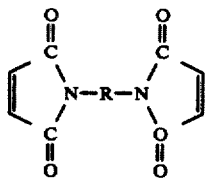
III wherein R is an alkylene, arylene, alkarylene or cycloalkylene group, or a polymeric linkage with a molecular weight sufficiently low to provide a cured coating resin having the desired physical properties. Bis-maleimides of Formula III can be prepared from di(primary)amines of the formula $H_2NRNH_2$. Preferably, R is $-(CH_2)_6-$, $-C_6H_4SO_2C_6H_4-$, $-C_6H_4CH_2C_6H_4-$ or $-C_6H_{10}CH_2C_6H_{10}-$.

It has also been found that certain corrosion-inhibiting pigments are capable of crosslinking the coating resin without causing coagulation before curing. Such crosslinking is believed to require the presence of an aromatic amino group (i.e., a group in which a nitrogen atom is connected to at least one aromatic ring or is part of an aromatic ring) in the coating resin. These corrosion-inhibiting pigments (referred to herein as "crosslinking pigments") are also described in the aforementioned Wilson, Jr. and Pocius patent application. Suitable crosslinking pigments are sparingly-soluble chromates such as barium chromate, lead chromate, and mixtures thereof. More soluble chromates such as strontium chromate, zinc chromate and sodium chromate have been found to be less acceptable, since they tend to cause rapid coagulation.

Other crosslinking agents that can be used to cure the coating resins of the invention include blocked isocyanates, aminoplasts and phenolplasts. However, they may provide cured coating films having lower maximum service temperatures than would be obtained using bis-maleimides or crosslinking pigments. Such other crosslinking agents are described in, e.g., U.S. Pat. Nos. 4,894,922, 3,959,106, 3,064,090, 4,134,864, 4,198,331, 4,248,753, 4,256,560, 4,339,369 and 4,376,848.

The amount of crosslinking agent should be sufficient to attain a suitable combination of storage stability, rate of cure, and cured coating physical properties. If a crosslinking pigment is used as the sole crosslinking agent, the cured coating film may tend toward roughness. Accordingly, sufficient crosslinking film-former preferably is included to provide a solvent-resistant cured coating and discourage roughness. For the preferred bis-maleimide crosslinking film-formers, amounts up to about 100% by weight based on the weight of coating resin are preferred, with amounts of about 20 to about 50% being more preferred, and about 30 to 35% being most preferred. High amounts of crosslinking pigment may tend to reduce bath stability. A preferred amount of crosslinking pigment is up to about 100% by weight based upon the weight of coating resin, with amounts of zero to about 40% being more preferred, and about 5 to 15% being most preferred.

If desired, noncrosslinking pigments can be added to the coating resin. Such pigments include sparingly-soluble molybdates, phosphates (e.g., zinc phosphate), and phospho-molybdates, and insoluble pigments such as carbon black, titania, and talc. Use of such pigments can provide additional corrosion inhibition, alter color, modify flow characteristics, or reduce cost.

For electrodeposition applications the coating resin preferably is combined with a resin solvent, a coalescing solvent, and water. Suitable resin solvents are insoluble or sparingly soluble in water but readily solubilize the coating resin, and volatilize at a temperature below that at which the coating resin will be cured. Such resin solvents include toluene, xylene, methyl isobutyl ketone (MIBK), and mixtures thereof. MIBK and xylene are preferred resin solvents. The amount of resin solvent should be sufficient to attain the desired balance of properties both in the bath and after a coated substrate is removed therefrom and dried, while minimizing solvent emission. Amounts of resin solvent up to about 100% by weight, based upon the weight of coating resin, are preferred. Suitable coalescing solvents are soluble in water, solubilize the coating resin, and volatilize at a temperature below that at which the coating resin will be cured. Preferred coalescing solvents include isopropanol, butanol, isophorone, 4-methoxy-4- methyl pentanone-2, alkyl ethers or ethylene glycol, 2-ethylhexanol, cyclohexanol, and mixtures thereof. The amount of coalescing solvent should be sufficient to attain the desired balance of properties both in the bath and after a coated substrate is removed therefrom and dried, while minimizing solvent emissions. Amounts of coalescing solvent up to about 50% by weight, based upon the weight of coating resin, are preferred. The water in the bath preferably is distilled or deionized water. If deionized water is used, its conductivity should be sufficiently low to enable efficient electrodeposition. The amount of water preferably is adjusted to provide about 1 to 40% solids in the bath, more preferably about 5 to 25%.

For non-electrodeposition applications, the coating resin preferably is combined with solvents of the type customarily used in water-borne coatings. Such solvents include water and volatile low molecular weight alcohols and ketones.

If desired, the coating resins of the invention can be combined with other adjuvants of the type customarily employed in water-borne coatings, e.g., crosslinking or polymerization catalysts (e.g., thermal catalysts or photoinitiators), antioxidants, surfactants, wetting agents, levelling agents, dispersing aids, defoamers, dyes and the like. The types and amounts of such adjuvants will be familiar to those skilled in the art.

The discussion that follows concerns a particularly preferred use for the coating resins of the invention, as a "CEDSABP" (cathodic electrophoretically-depositable structural adhesive bonding primer). Such CEDSABPs constitute an additional aspect of the invention and are particularly useful for priming aluminum substrates that will be subjected to high temperature service. Typically, the CEDSABPs of the invention contain a coating resin, crosslinking agent, resin solvent, coalescing solvent and distilled or deionized water. The various ingredients in the coating can be combined, for example, by dispersing the coating resin in water, resin solvent, and/or coalescing solvent. This preferably is carried out by slowly adding water to the coating resin with stirring until a viscosity maximum (indicative of an emulsion phase inversion) is observed. After inversion occurs water can be added rapidly, along with any additional desired resin and/or coalescing solvent(s), to provide the desired solids level and desired amount of solvents. High molecular weight coating resins preferably are dispersed under high shear conditions. Separately, the crosslinking agent(s) (e.g., crosslinking film-former and/or crosslinking pigment) are dispersed in water using mechanical milling. Dispersion of particulate ingredients will be made easier by adding an appropriate amount of the coating resin (e.g. about 1 to 25% by weight based on the total weight of crosslinking agent(s)) as a dispersing aid. The resulting dispersion is then blended with the solution of coating resin, water and solvent(s) and the amount of water adjusted to provide the desired solids level in the final CEDSABP.

The CEDSABP can be applied to metallic substrates using methods familiar to those skilled in the art. The CEDSABP preferably is placed in a nonconductive vessel equipped with a stirrer and a metallic (e.g., stainless steel) anode. The vessel itself, if metallic, can serve as the anode. The substrate to be coated is placed in fluid contact with the CEDSABP bath. The substrate and anode are connected to a power supply so that the substrate serves as the cathode. Although voltages as high as 300 volts or more can be used, lower voltages (e.g., about 5 to 80 volts) preferably are used. Current is permitted to flow for a sufficiently long time period to attain the desired coating thickness (e.g., typically a thickness of about 0.002 to about 0.008 millimeters) at the chosen voltage. Such time period preferably is less than about 1 minute and more preferably is less than about 20 seconds. After the substrate has been disconnected from the voltage, excess CEDSABP is removed from the substrate (e.g., by draining and rinsing with water). The coated substrate preferably is allowed to air dry for a short period of time (e.g., about ¼ hour), followed by heating in an oven at a temperature and for a time sufficient to crosslink the CEDSABP coating. On aluminum, curing temperatures of about 176° C. or less and curing times of about 2 hours or less preferably are employed. Higher cure or post-cure temperatures (e.g., 232° C.) and shorter or longer curing times can be used if desired, especially on heat-resistant substrates such as titanium or steel. Higher cure temperatures and shorter curing times are particularly useful for curing CEDSABPs made from coating resins in which the E precursor is longer than DGEBA.

In typical use, the CEDSABP bath should be periodically replenished, to maintain the desired content and composition of active ingredients. Bath stability will be enhanced by avoidance of excessive nitrogen atom content in the coating resin, addition of an appropriate dispersing aid (e.g., a coating resin containing polyethylene oxide groups), classification and/or filtration of particulates in the CEDSABP, periodic refiltration of the CEDSABP, and appropriate control of pH (e.g., by employing a slightly alkaline pH for CEDSABPs containing barium chromate).

The following examples are offered to aid understanding of the present invention and are not to be construed as limiting the scope thereof. Unless otherwise indicated, all parts and percentages are by weight. In the examples, the following procedures and tests were used for sample preparation and evaluation:

Dynamic Mechanical Analysis

The effect of an L precursor upon the $T_g$ of a cured epoxy resin was evaluated by refluxing a DGEBA resin with the L precursor in a 1.05:1 molar ratio of DGEBA to epoxide-reactive groups in the L precursor, using xylene as the solvent. The resulting epoxy-functional product was analyzed for epoxy equivalent weight, combined with piperidine in a 9.08:1 molar ratio of epoxy groups to piperidine and diluted with a 50:50 volume mixture of xylene and methylene chloride. A glass braid was thrice dipped in the resulting solution and air-dried until clear, then allowed to air-dry for an additional hour, heated in a 121° C. oven for 2 hours, and heated in a 176° C. oven for 17 hours. The $T_g$ of the coating on the braid was evaluated using a "DuPont 9900" dynamic mechanical analysis apparatus heated from room temperature to 250° C. at 5° per minute, using an amplitude of 0.2 mm.

Overlap Shear Strength

Panels of bare or clad 2024-T3 aluminum were prepared for testing in accordance with ASTM D-1002 and cleaned in accordance with ASTM D-2651-79, Method G, but using a 10 minute etch. The etched panels were rinsed in tap water, then phosphoric acid anodized in accordance with Boeing specification BAC-5555. The anodized panels were primed by placing them in a stirred CEDSABP bath in a glass tank equipped with a stainless steel anode and applying a potential of 40 Volts DC for 10 seconds. The primed panels were air dried, then placed in an air circulating oven at 176° C. for 1 to 2 hours. The primed panels were bonded to one another in an overlap relationship along their long dimension using a 12.7 mm wide strip of epoxy film adhesive ("AF-143", 0.366 kg/m², 3M). The resulting assembly was fastened together using tape and cured in a "Bros" autoclave. The temperature of the autoclave was increased by 2° to 3° C./min to a maximum temperature of 177° C., held at that temperature for 1 hour, air-cooled to 79° C., then water-cooled to 25° C. The bonded panels were sawn into strips and evaluated for overlap shear strength in accordance with ASTM D-1002 using four different test temperatures (−55° C., 25° C., 149° C. and 176° C.). Sawn strips were also exposed to elevated temperatures for extended periods of time, then evaluated for overlap shear strength in order to assess retention of coating properties after heat aging.

Floating Roller Peel Strength

Panels of bare or clad 2024-T3 aluminum were prepared for testing in accordance with ASTM D-3167-76, then cleaned, anodized and primed using the same procedure employed for overlap shear samples. The primed panels were bonded together using the same film adhesive and cure cycle employed for overlap shear samples, then evaluated for floating roller peel strength in accordance with ASTM D-3167-76, but using 25.4 mm wide strips and an "Instron" tensile tester operated at a peel rate of 305 mm/min.

Solvent Resistance

Solvent resistance was evaluated using two methods. In the first method, a coating composition was determined to have excellent solvent resistance if it was not perceptibly removed by 100 double rubs with a piece of cheesecloth soaked in methyl ethyl ketone (MEK) and the cheesecloth remained clean. A coating composition was determined to have good solvent resistance if some pigment transferred to the cheescloth but the coating did not otherwise appear to have been removed, and to have marginal solvent resistance if the coating was perceptibly removed.

In the second method, sovlent resistance was evaluated by comparing the initial pencil hardness of the coating to its pencil hardness after immersion for 7 days in phosphate ester hydraulic fluid or in jet fuel.

Corrosion Resistance

Primed aluminum panels were scribed with an "X" and exposed to salt spray as specified in ASTM B-117, using a 30 day exposure period. A coating composition was determined to have excellent corrosion resistance if it did not blister and corrosion did not creep under the coating adjacent to the scribe mark. A coating composition was determined to have good corrosion resistance if only minor blistering or creep occured.

Throwpower

Throwpower was evaluated by placing an aluminum panel in a CEDSABP bath with one surface of the panel against the side of the bath tank. This panel surface was referred to as the "backside", and was examined after a CEDSABP coating had been applied and cured on the remainder of the panel. A CEDSABP was regarded as having poor throwpower if no coating formed on the backside. A CEDSABP was regarded as having good throwpower if a coating formed at least 1 mm in from the perimeter of the backside. A CEDSABP was regarded as having excellent throwpower if a coating formed at least 1 cm in from the perimeter of the backside.

The following ingredients were prepared for use in the examples:

Coating Resin A

209 Parts DGEBA resin with an epoxy equivalent weight of 185 to 192 ("EPON 828", Shell Chemical Co.) and 100 Parts 9,9-bis(4-methylaminophenyl)fluorene were combined in a heated reaction vessel and stirred at 150° C. for 2 hours. 109 Parts mixed xylenes were added to the reaction mixture to dissolve it. 105 Parts of the resulting light-brown EL reaction product solution were placed in a heated reaction vessel maintained at a temperature of 50° C. A mixture of 10 parts diethylamine, 10 parts 2-butoxyethanol and 5 parts distilled water was added dropwise to the reaction vessel over a period of 5 minutes. The resulting opalescent reaction mixture was allowed to react for 1.5 hours, then allowed to react for an additional 1.5 hours at a temperature of 92° C. The reaction vessel was opened to the air for 15 minutes and then closed. A mixture of 14.5 parts of an 85% aqueous solution of lactic acid, and 5 parts distilled water was added dropwise to the reaction vessel over a period of 5 minutes. The mixture was allowed to react for 45 minutes at 80° C. A solution of 18 parts 2-butoxyethanol and 5 parts distilled water was added to the reaction vessel. The resulting viscous, light-brown mixture was stirred for 15 minutes, then removed from the vessel and identified as "Coating Resin A".

The $T_g$-enhancing effect of the L precursor 9,9-bis(4-methylaminophenyl)fluorene used in Coating Resin A was evaluated by refluxing 394 parts EPON 828 epoxy resin and 188.2 parts 9,9-bis(4-methyaminophenyl)fluorene in 194 parts mixed xylenes for 3 hours. The resulting transparent, light brown EL reaction product solution contained 75.2% solids, had an epoxy equivalent weight of 587 (pyridine-HCl titration) and had a room temperature Brookfield viscosity of 80,000 cps (spindle no. 6, 10 rpm). 19.33 Parts of the EL reaction product solution were combined with 0.25 parts piperidine and 54.6 parts of a 50:50 volume mixture of xylene:methylene chloride, then analyzed using the dynamic mechanical analysis procedure described above. The measured $T_g$ was 167° C. In a comparison run, 394 parts "EPON 829" epoxy resin (a precatalyzed version of EPON 828 epoxy resin), 114 parts bisphenol A and 169 parts mixed xylenes were refluxed for 7 hours to form a light yellow, hazy reaction product solution that contained 71.8% solids, had an epoxy equivalent weight of 489.8 (perchloric acidtetrabutylammonium iodide titration), and had a room temperature Brookfield viscosity of 10,300 cps (spindle no. 6, 20 rpm). 25.523 Parts of the reaction product solution were combined with 0.337 parts piperidine and 54.6 parts of the xylene:methylene chloride solution, and analyzed using dynamic mechanical analysis. A measured Tg of 114° C. was obtained. Thus, the L precursor used in Coating Resin A provides a 53° C. $T_g$ enhancement when compared to a cured epoxide made using bisphenol A in place of such L precursor.

Coating Resin B

The procedure employed for making Coating Resin A was repeated, with the following differences. The EL reaction product was heated to 90° C. instead of 50° C. 14.4 Parts of diethanolamine were used in place of 10 parts of diethylamine. Following addition of the diethanolamine:2-butoxyethanol:water mixture the reaction mixture was allowed to react for 3 hours at 90° C. Following addition of the lactic acid:water mixture the reaction mixture was heated to 90° C. instead of 80° C. Following addition of the 2-butoxyethanol:water solution, the reaction mixture was stirred for 5 minutes rather than 15 minutes. The final product was identified as "Coating Resin B".

Coating Resin C

312 Parts EPON 828 epoxy resin and 150 parts 9,9-bis(4-methylaminophenyl)fluorene were combined in a heated reaction vessel and stirred at 150° C. for 3 hours. The temperature of the reaction mixture was reduced to 120° C. and 160 parts MIBK added to the reaction mixture to dissolve it. The temperature of the reaction mixture was reduced to 90° C. A mixture of 100 parts thiodiethanol, 86.7 parts of an 85% percent aqueous solution of lactic acid, and 62 parts distilled water was added dropwise to the reaction vessel over a period of 15 minutes. The reaction mixture was allowed to react for 30 minutes, resulting in formation of a cloudy yellow ELT reaction product. A solution of 55 parts 2-butoxyethanol and 32 parts distilled water was added to the reaction vessel. The resulting solution was stirred for a few minutes, followed by addition of 55 parts 2-butoxyethanol. The solution was stirred for an additional 15 minutes, becoming more transparent. 200 Parts of the resulting yellowish solution were transferred to a flask to which was added with stirring 34.8 parts MIBK and 52.2 parts 2-butoxyethanol. The speed of the stirrer was increased and 600 parts distilled water were slowly added to the reaction vessel, resulting in formation of a brown-white emulsion. The emulsion was removed from the vessel and identified as "Coating Resin C".

Coating Resin D

112 Parts EPON 829 epoxy resin and 50 parts 9,9-bis(4-hydroxyphenyl)fluorene were combined in a heated reaction vessel and stirred at 150° C. for 2 hours. 57 Parts mixed xylenes were added to the reaction mixture to dissolve it. The temperature of the reaction mixture was reduced to 55° C. A mixture of 21.9 parts diethylamine, 20 parts 2-butoxyethanol and 10 parts distilled water was added dropwise to the reaction vessel over a period of about one-half hour. The reaction mixture became cloudy. The reaction was permitted to proceed overnight, then the temperature of the reaction mixture was increased to 90° C. A solution of 31.8 parts of an 85% aqueous solution of lactic acid, and 10.5 parts of distilled water was added dropwise to the reaction vessel over a period of about one-half hour. The mixture was allowed to react for 45 minutes at 90° C. A solution of 38 parts 2-butoxyethanol and 11 parts distilled water was added to the reaction vessel. The resulting amber, translucent mixture was stirred for a few minutes, then removed from the vessel and identified as "Coating Resin D".

The dynamic mechanical analysis procedure used for Coating Resin A was repeated using the L precursor 9,9-bis(4-hydroxyphenyl)fluorene of Coating Resin D. 394 Parts EPON 829 epoxy resin, 175 parts 9,9-bis(4-hydroxyphenyl)fluorene and 189 parts mixed xylenes were refluxed overnight to form a light brown EL reaction product solution that was hazy at room temperature but transparent when hot. The EL reaction product solution contained 72.8% solids, had an epoxy equivalent weight of 541.6 (perchloric acid-tetrabutylammonium iodide titration) and a room temperature Brookfield viscosity of 162,000 (spindle no. 7, 20 rpm). 19.42 Parts of the reaction product solution were combined with 0.265 parts piperidine and 54.6 parts of the xylene:methylene chloride solution, then analyzed using the dynamic mechanical analysis procedure described above. A measured $T_g$ of 150° C. was obtained. Thus the L precursor used in Coating Resin D provided a 36° C. $T_g$ enhancement when compared to a cured epoxide made using bisphenol A in place of such L precursor.

Coating Resin E 83.6 Parts EPON 828 epoxy resin and 40 parts 9,9-bis(4-methylaminophenyl)fluorene were combined in a heated reaction vessel and stirred at 150° C. for 2 hours. 40 Parts MIBK were added to the reaction mixture to dissolve it. The temperature of the reaction mixture was reduced to 90° C. A mixture of 28.1 parts thiodiethanol, 46.8 parts of an 85% aqueous solution of lactic acid, and 25.3 parts of distilled water was added dropwise to the reaction vessel over a period of about one-half hour. The resulting mixture was allowed to react for 4 hours. The reaction mixture was initially cloudy but began to clear after the first hour of the reaction. A solution of 29 parts 2-butoxyethanol and 8.4 parts distilled water was added dropwise to the reaction mixture over a period of about one-half hour. The mixture was stirred about three-quarters of an hour, then removed from the vessel and identified as "Coating Resin E".

Coating Resin F 262.5 Parts 290 to 335 epoxy equivalent weight DGEBA resin ("EPON 836", Shell Chemical Co.) and 75.6 parts 9,9-bis(4-methylaminophenyl)fluorene were combined in a heated reaction vessel and stirred at 150° C. for 2.5 hours. 200 Parts MIBK were added to the reaction vessel and the temperature of the reaction mixture was reduced to 90° C. A mixture of 55 parts thiodiethanol, 48.2 parts of an 85% aqueous solution of lactic acid, and 35 parts distilled water was added dropwise to the reaction mixture over a period of about one-half hour. The resulting mixture was allowed to react for 40 minutes. A solution of 100 parts 2-butoxyethanol and 62 parts distilled water was added dropwise to the reaction mixture over a period of about one-half hour. The resulting translucent, brown mixture was stirred until it became homogeneous, then removed from the vessel and identified as "Coating Resin F".

Coating Resin G

The procedure employed for making Coating Resin F was repeated, with the following differences. 420 Parts 450 to 550 epoxy equivalent weight DGEBA resin ("EPON 1001", Shell Chemical Co.) were used in place of 262.5 parts EPON 836 epoxy resin. The amount of MIBK was increased to 271 parts. The 2-butoxyethanol:water solution contained 135.3 parts 2-butoxyethanol and 100.5 parts water. The final product was identified as "Coating Resin G".

Coating Resin H

The procedure employed for making Coating Resin F was repeated, with the following differences. 157.5 Parts EPON 828 epoxy resin were employed in place of 262.5 parts EPON 836 epoxy resin. The amount of MIBK was reduced to 150 parts. The 2-butoxyethanol:- water solution contained 75 parts 2-butoxyethanol and 41 parts water. The final product was identified as "Coating Resin H".

Comparative Coating Resin A

A coating resin lacking amino nitrogen atoms, but containing bisphenol A as a linking compound within the epoxide backbone, was prepared by combining 250 parts EPON 1001 epoxy resin and 83.3 parts MIBK at 90° C. in a heated reaction vessel, and adding dropwise to the reaction vessel over a period of about one-half hour a mixture of 61.1 parts thiodiethanol, 53 parts of an 85% aqueous solution of lactic acid, and 38 parts distilled water. The resulting mixture was allowed to react for 30 minutes. Next, a solution of 51 parts 2-butoxyethanol and 34.5 parts distilled water was added to the reaction vessel. The resulting translucent, yellow mixture was stirred until it was homogeneous, then an additional 63.4 parts 2-butoxyethanol was added with stirring. The solution was stirred for a few minutes, allowed to cool, removed from the vessel and identified as "Comparative Coating Resin A".

Comparative Coating Resin B

A coating resin without amino nitrogen atoms or a linking compound was prepared by heating 150 Parts EPON 828 epoxy resin and 50 parts MIBK to a temperature of 90° C. in a reaction vessel equipped with a stirrer, and adding dropwise to the reaction vessel over a period of 15 minutes a mixture of 90 parts thiodiethanol, 85.9 parts of an 85% percent aqueous solution of lactic acid, and 62 parts distilled water. The reaction mixture was allowed to react at 85° to 90° C. for 30 minutes. A solution of 51 parts 2-butoxyethanol and 32 parts distilled water was added to the reaction vessel, stirred for a few minutes, and followed by the addition of 55 parts 2-butoxyethanol. 200 Parts of the resulting yellowish solution were transferred to a flask to which was added with stirring 34.8 parts MIBK and 52.2 parts 2-butoxyethanol. The speed of the stirrer was increased and 600 parts distilled water were slowly added to the reaction vessel, resulting in formation of an emulsion. The emulsion was removed from the vessel and identified as "Comparative Coating Resin B".

Film-Former Dispersion A

100 Parts bis-maleimide ("XU292", Ciba Geigy, believed to be 3,3'-diphenylsulfone bis-maleimide), 200 parts distilled water and 10 parts Coating Resin C were milled in a ball mill for 24 hours using ceramic media. The resulting dispersion was removed from the ball mill and identified as "Film-Former Dispersion A".

Film-Former Dispersion B

The procedure employed for making Film-Former Dispersion A was repeated, but using as the bis-maleimide "Bismaleimide S" (Mitsui Toatsu Chemicals, Inc.). The dispersion was identified as "Film-Former Dispersion B".

Film-Former Dispersion C

The procedure employed for making Film-Former Dispersion A was repeated, but using as the bis-maleimide "Bismaleimide M" (Mitsui Toatsu Chemicals, Inc.). The dispersion was identified as "Film-Former Dispersion C".

Film-Former Dispersion D

The procedure employed for making Film-Former Dispersion A was repeated, but using as the bis-maleimide "Bismaleimide M-20" (Mitsui Toatsu Chemicals, Inc.). The dispersion was identified as "Film-Former Dispersion D".

Pigment Dispersion A

100 Parts barium chromate, 200 parts distilled water and 10 parts Coating Resin C were milled in a ball mill for 24 hours using ceramic media. The resulting dispersion was removed from the mill and identified as "Pigment Dispersion A".

Pigment Dispersion B

The procedure employed for making Pigment Dispersion A was repeated, using titanium dioxide in place of barium chromate. The resulting dispersion was identified as "Pigment Dispersion B".

Pigment Dispersion C

The procedure employed for making Pigment Dispersion A was repeated, using lead chromate in place of barium chromate. The resulting dispersion was identified as "Pigment Dispersion C".

Pigment Dispersion D

The procedure employed for making Pigment Dispersion A was repeated, using zinc chromate in place of barium chromate. The resulting dispersion was identified as "Pigment Dispersion D".

Pigment Dispersion E

The procedure employed for making Pigment Dispersion A was repeated, using 180 parts strontium chromate in place of 100 parts barium chromate. The resulting dispersion was identified as "Pigment Dispersion E".

The above-described ingredients were used to prepare a varity of CEDSABPs, as described in the following examples:

EXAMPLE 1

100 Parts Coating Resin A, 25.8 parts mixed xylenes and 28 parts 2-butoxyethanol were combined in a mixing vessel equipped with a high speed stirrer and mixed until homogeneous. 321.8 Parts distilled water were mixed in at high speed to form a stable emulsion. To this emulsion was added 110 parts Film-Former Dispersion A, 132.6 parts Pigment Dispersion A and 678.3 parts distilled water. The mixture was stirred at a reduced speed until a yellow, low viscosity dispersion was obtained. The dispersion was identified as "CEDSABP 1".

CEDSABP 1 was cathodically electrophoretically applied to bare aluminum and cured at 176° C. for 1 hour. An orange, MEK-resistant coating was obtained. The coating leveled well and had excellent throwing power. The following lap shear strength and floating roller peel strength values were obtained:

| Lap shear: | |
|---|---|
| −55° C., initial | 257 kg/cm$^2$ |
| 25° C., initial | 253 kg/cm$^2$ |
| 25° C., aged 500 hours at 149° C. | 234 kg/cm$^2$ |
| 25° C., aged 1,000 hours at 149° C. | 250 kg/cm$^2$ |
| 149° C., initial | 232 kg/cm$^2$ |
| 149° C., aged 500 hours at 149° C. | 215 kg/cm$^2$ |
| 149° C., aged 1,000 hours at 149° C. | 236 kg/cm$^2$ |
| 176° C., initial | 184 kg/cm$^2$ |
| 176° C., aged 500 hours at 149° C. | 188 kg/cm$^2$ |
| 176° C., aged 1,000 hours at 149° C. | 185 kg/cm$^2$ |
| Floating roller peel: | 710 g/cm of width |

The samples failed primarily within the adhesive rather than within the primer, indicating that the primer was performing its intended function. Comparable coatings could be prepared after storing the CEDSABP for 1 week at room temperature, indicating that the CEDSABP had useful bath stability.

The above overlap shear strength results can be compared with CEDSABP "MD-902" of the Beckwith reference. Its 201 kg/cm$^2$ initial lap shear strength at 149° C. decreased significantly after heat aging, reaching a value of 171 kg/cm$^2$ at 149° C. after only 200 hours aging at 149° C. In contrast, the overlap shear strength of the CEDSABP of this EXAMPLE 1 remained above that of MD-902 even after much longer aging times, and increased in strength after aging for 1000 hours.

EXAMPLE 2

This example illustrates a coating resin having hydroxyalkyl groups in the C moiety. The procedure employed for making CEDSABP 1 was repeated, with the following differences. The initial mixture charge contained 88.5 parts Coating Resin B, 16.7 parts mixed xylenes and 23.4 parts 2-butoxyethanol. To this was added 269 parts distilled water to form a stable emulsion, followed by a charge of 92.2 parts Film-Former Dispersion A, 110.6 parts Pigment Dispersion A and 566.8 parts distilled water. The resulting yellow, low viscosity dispersion was identified as "CEDSABP 2".

CEDSABP 2 was cathodically electrophoretically applied to bare aluminum and cured at 176° C. for 2 hours. A tan, MEK-resistant coating was obtained. The coating leveled well and exhibited excellent throwing power. The following lap shear strength and floating roller peel strength values were obtained:

| Lap shear: | |
|---|---|
| −55° C., initial | 287 kg/cm$^2$ |
| 25° C., initial | 253 kg/cm$^2$ |
| 25° C., aged 500 hours at 149° C. | 246 kg/cm$^2$ |
| 25° C., aged 1,000 hours at 149° C. | 239 kg/cm$^2$ |
| 149° C., initial | 229 kg/cm$^2$ |
| 149° C., aged 500 hours at 149° C. | 220 kg/cm$^2$ |
| 149° C., aged 1,000 hours at 149° C. | 239 kg/cm$^2$ |
| 176° C., initial | 192 kg/cm$^2$ |
| 176° C., aged 500 hours at 149° C. | 195 kg/cm$^2$ |
| 176° C., aged 1,000 hours at 149° C. | 207 kg/cm$^2$ |
| Floating roller peel: | 890 g/cm of width |

As with CEDSABP 1, bonds made with CEDSABP 2 failed primarily within the adhesive rather than within the primer. Substantially better overlap shear strength was obtained after aging than could be obtained using primer MD-902 of the Beckwith reference.

EXAMPLE 3

This example illustrates a coating resin having a sulfonium C moiety. 502.48 Parts Coating Resin C were placed in a vessel equipped with a stirrer. 741.3 Parts distilled water were slowly stirred in to obtain a smooth dispersion. 139.8 Parts Pigment Dispersion A were slowly added to the vessel, followed by the slow addition of 126.5 parts Film-Former Dispersion A. The resulting yellow, low viscosity dispersion was identified as "CEDSABP 3".

CEDSABP 3 was cathodically electrophoretically applied to bare aluminum using the method of EXAMPLE 2. A yellow-green, MEK-resistant coating was obtained. The coating levelled well and exhibited good throwing power. The following lap shear strength and floating roller peel strength values were obtained:

| Lap shear: | |
|---|---|
| −55° C. | 246 kg/cm$^2$ |
| 25° C. | 266 kg/cm$^2$ |
| 149° C. | 213 kg/cm$^2$ |
| 176° C. | 178 kg/cm$^2$ |
| Floating roller peel (0.003 mm thick primer film): | 1800 g/m of width |

In order to evaluate the resistance of the cured CEDSABP 3 coating to heat aging, bonded samples were stored at 149° C. for various periods of time, then evaluated for lap shear strength at three test temperatures. The lap shear strengths at 25° C., 149° C. and 171° C. were as follows:

| | Hours at 149° C. | | |
|---|---|---|---|
| Lap shear, Kg/cm$^2$: | 0 | 500 | 1000 |
| 25° C. | 266 | 224 | 248 |
| 149° C. | 213 | 247 | 229 |
| 176° C. | 178 | 202 | 227 |

These results indicate excellent retention of shear strength. Once again, the results were substantially better than those reported for primer MD-902.

Scribed aluminum panels coated with CEDSABP 3 exhibited no corrosion after 30 days of salt spray exposure. The initial coating pencil hardness of "9H" was unchanged after 7 days immersion in phosphate ester hydraulic fluid or in jet fuel.

EXAMPLES 4-16

The procedure employed for making CEDSABP 3 was repeated, using a variety of coating resins, solvents, film-formers and pigments. Set out below in Table I are the identity of each CEDSABP, and the identity and amounts of coating resin, resin solvent, coalescing solvent, water, pigment dispersion and film-former dispersion in each CEDSABP. The ingredients were added in the order they appear in each row of the table when read from left to right.

TABLE I

| Ex. | CEDSABP | Coating Resin Type | Coating Resin Parts | Resin solvent Type | Resin solvent Parts | Coalescing solvent Type | Coalescing solvent Parts | Water Parts | Pigment Dispersion Type | Pigment Dispersion Parts | Film-Former Dispersion Type | Film-Former Dispersion Parts |
|---|---|---|---|---|---|---|---|---|---|---|---|---|
| 4 | 4 | B | 100 | | | | | 68.5 | A | 17.7 | | |
| 5 | 5 | B | 100 | MX⁽¹⁾ | 15.2 | BE⁽²⁾ | 25.6 | 592.7 | A | 76.8 | | |
| 6 | 6 | B | 100 | | | | | 68.5 | C | 17.7 | | |
| 7 | 7 | B | 100 | | | | | 68.5 | D | 17.7 | | |
| 8 | 8 | B | 100 | | | | | 76.7 | E | 9.5 | | |
| 9 | 9 | C | 100 | MIBD⁽³⁾ | 17.4 | BE | 26.1 | 430.5 | | | | |
| 10 | 10 | C | 100 | MIBK | 17.4 | BE | 26.1 | 705.4 | B | 123.4 | | |
| 11 | 11 | C | 100 | MIBK | 17.4 | BE | 26.1 | 430.5 | | | A | 102.9 |
| 12 | 12 | D | 100 | MX | 6.5 | BE | 23.7 | 548 | A | 71.0 | | |
| 13 | 13 | E | 100 | MIBK | 0.2 | BE | 22.3 | 367.5 | | | | |
| 14 | 14 | E | 100 | MIBK | 0.2 | BE | 22.3 | 515.7 | A | 66.8 | | |
| 15 | 15 | E | 100 | MIBK | 0.2 | BE | 22.3 | 595.3 | B | 105.3 | | |
| 16 | 16 | E | 100 | MIBK | 0.2 | BE | 22.3 | 367.5 | | A | 87.3 | |

Notes to entries in TABLE I
⁽¹⁾MX = Mixed xylenes.
⁽²⁾BE = 2-Butoxyethanol.
⁽³⁾MIBK = Methyl isobutyl ketone.

CEDSABP 7 and CEDSABP 8 (which contained zinc chromate and strontium chromate respectively) coagulated after addition of the pigment dispersion. It is believed that use of a less soluble pigment would have reduced or eliminated such coagulation.

CEDSABPs 4–6 and CEDSABPs 9–16 were individually cathodically electrophoretically applied to aluminum using the method of EXAMPLE 2. MEK-resistant coatings were obtained from CEDSABPs 4, 5, 11, 14 and 16, and a partially MEK-resistant coating was obtained from CEDSABP 6. CEDSABPs 9, 10, 12, 13 and 15 did not provide MEK-resistant coatings. For CEDSABPs 9 and 13, the lack of solvent resistance was thought to be due to the absence of a crosslinking film-former or crosslinking pigment. For CEDSABPs 10 and 15, the lack of solvent resistance was thought to be due to the absence of a bis-maleimide and the inability of $TiO_2$ (the only pigment in the CEDSABP) to promote crosslinking of the coating resins of this invention. For CEDSABP 12, the lack of solvent resistance was thought to be due to the absence of a crosslinking film-former and the absence of an amino group that could facilitate crosslinking by barium chromate.

EXAMPLES 17–19

CEDSABPs 17–19 were prepared by stirring together crosslinking film-former, crosslinking pigment and a coating resin. Distilled water was added slowly to the mixture to reduce the solids level to 20%. The mixture was milled in a ball mill for 24 hours using ceramic media. After milling, the solids level was reduced to 10% by adding additional distilled water. The ingredients in each CEDSABP are set out below in TABLE II:

TABLE II

| Ingredient | CEDSABP 17 | CEDSABP 18 | CEDSABP 19 |
|---|---|---|---|
| "XU-292" bis-maleimide | 39.8 | 39.8 | 39.8 |
| $BaCrO_4$ | 48 | 48 | 48 |
| Coating Resin F | 114.4 | | |
| Coating Resin G | | 141.8 | |
| Coating Resin H | | | 145.1 |
| Distilled water | 570.4 | 597.8 | 566.4 |

These CEDSABPs were individually cathodically electrophoretically applied to aluminum using the method of EXAMPLE 2. All three coatings leveled well and displayed good throwing power. Set out below in Table III are the characteristics of the cured coatings. The entry "–" indicates that the CEDSABP was not evaluated at the indicated test condition.

TABLE III

| Property | CEDSABP 17 | CEDSABP 18 | CEDSABP 19 |
|---|---|---|---|
| Lap shear, kg/cm²: | | | |
| 25° C., initial | 256 | 226 | 248 |
| 25° C., aged 2,500 hours at 149° C. | — | — | 221 |
| 25° C., aged 2,500 hours at 176° C. | — | — | 187 |
| 149° C., initial | 225 | 209 | 238 |
| 149° C., aged 2,500 hours at 149° C. | — | — | 251 |
| 149° C., aged 2,500 hours at 176° C. | — | — | 204 |
| Floating roller peel, g/cm of width at 25° C.: | 1070 | 1750 | 1390 |

An MEK rub test on coatings made from the above CEDSABPs, cured at 176° C. for 2 hours, indicated that CEDSABP 19 had excellent solvent resistance, whereas CEDSABPs 17 and 18 had marginal solvent resistance. All three CEDSABPs had excellent solvent resistance when cured for one hour at 176° C. followed by 20 minutes at 232° C.

The above data indicates that as the ratio of nitrogen to epoxy in the CEDSABP was increased, the curing energy required to achieve a solvent-resistance coating was reduced.

EXAMPLES 20–22

This example illustrates the use of a variety of crosslinking film formers. CEDSABPs 20–22 were prepared by slowly adding distilled water to a rapidly stirred portion of Coating Resin C, until the emulsion reached its inversion point. Crosslinking film-former, crosslinking pigment and additional distilled water were added with stirring until a homogeneous mixture was obtained. Set out below in Table IV are the amounts and types of ingredients in each CEDSABP.

TABLE IV

| Ingredient | CEDSABP 20 | CEDSABP 21 | CEDSABP 22 |
|---|---|---|---|
| Coating Resin C | 84.3 | 84.3 | 84.3 |
| Film-Former Dispersion B | 77.6 | | |
| Film-Former Dispersion C | | 77.6 | |

TABLE IV-continued

| Ingredient | CEDSABP 20 | CEDSABP 21 | CEDSABP 22 |
|---|---|---|---|
| Film-Former Dispersion D | | | 77.6 |
| Pigment Dispersion A | 93.2 | 93.2 | 93.2 |
| Distilled Water (total) | 745 | 745 | 745 |

These CEDSABPs were cathodically electrophoretically applied to phosphoric acid-anodized bare aluminum using the method of EXAMPLE 2. Set out below In Table V are the properties of the cured coatings:

TABLE V

| Property | CEDSABP 20 | CEDSABP 21 | CEDSABP 22 |
|---|---|---|---|
| Lap shear, kg/cm$^2$: | | | |
| −55° C., initial | 251 | 254 | 275 |
| 25° C., initial | 256 | 281 | 285 |
| 25° C., aged 500 hours at 149° C. | 245 | 232 | 240 |
| 149° C., initial | 200 | 193 | 210 |
| 149° C., aged 500 hours at 149° C. | 224 | 226 | 233 |
| 176° C., initial | 182 | 171 | 188 |
| 176° C., aged 500 hours at 176° C. | 212 | 184 | 215 |
| Floating roller peel, g/cm of width, 25° C.: | 2320/ 1790 | 1607 | |
| Pencil hardness: | | | |
| Initial | 9H | 9H | 9H |
| Aged 7 days in phosphate ester hydraulic fluid | 9H | 9H | 9H |
| Aged 7 days in jet fuel | 9H | 9H | 9H |
| MEK resistance: | excellent | excellent | excellent |
| Corrosion resistance: | excellent | excellent | excellent |
| Bath stability, aged 6 weeks at 25° C.: | excellent | hard to redisperse | good, but rough coating |

EXAMPLES 23-25

These examples illustrate the use of additional crosslinking film-formers. CEDSABPs 23-25 were prepared by slowly adding crosslinking film-former to a rapidly stirred portion of Coating Resin C. The mixture was "let down" with distilled water, and then Pigment Dispersion A was added with stirring. The ingredients in each CEDSABP are set out below in TABLE VI:

TABLE VI

| Ingredient | CEDSABP 23 | CEDSABP 24 | CEDSABP 25 |
|---|---|---|---|
| Coating Resin C | 84.26 | 84.26 | 84.26 |
| "Cymel 300" (1) | 51 | | |
| "Mondur XB749" (2) | | 55.7 | |
| "Desmocap 11A" (3) | | | 55.7 |
| Distilled water | 772 | 772 | 772 |
| Pigment Dispersion A | 93.2 | 93.2 | 93.2 |

Notes to entries in TABLE VI:
(1) Methoxylated urea resin, commercially available from Ciba Geigy Corp.
(2) Blocked isocyanate, commercially available from Mobay Chemical Corp.
(3) Blocked isocyanate, commercially available from Mobay Chemical Corp.

These CEDSABPs were cathodically electrophoretically applied to phosphoric acid-anodized bare aluminum using the method of EXAMPLE 2. Set out below in TABLE VII are the properties of the cured coatings:

TABLE VII

| Property | CEDSABP 23 | CEDSABP 24 | CEDSABP 25 |
|---|---|---|---|
| Lap shear, kg/cm$^2$: | | | |
| −55° C., initial | 238 | 102 | 123 |
| 25° C., initial | 268 | 77 | 93 |
| 25° C., aged 500 hours at 149° C. | 207 | 39 | 39 |
| 149° C., initial | 200 | 36 | 38 |
| 149° C., aged 500 hours at 149° C. | 236 | 29 | 27 |
| 176° C., initial | 174 | 37 | 43 |
| 176° C., aged 500 hours at 149° C. | 268 | 25 | 27 |
| Floating roller peel, g/cm of width, 25° C.: | 1780 | 360 | 360 |
| Pencil Hardness: | | | |
| Initial | — | 4H | 5–6H |
| Aged 7 days in phosphate ester hydraulic fluid | — | dissolved | dissolved |
| Aged 7 days in jet fuel | — | <2H (tacky) | tacky |
| MEK resistance: | good | marginal | marginal |
| Corrosion resistance: | slight corrosion and staining | good | good |
| Bath stability, aged 6 weeks at 25° C. | powdery, nonadherent coating | tacky cured coating | hard to redisperse, tacky cured coating |

The above data illustrates the use of crosslinking film-formers other than bis-maleimides. In general, lower physical properties and/or reduced bath stability occured when these crosslinking film-formers were substituted for bis-maleimides.

COMPARATIVE EXAMPLE 1

This comparative example illustrates the increased cure temperature required for a CEDSABP made using a coating resin and crosslinking film former of the type customarily used in bis-maleimide-crosslinked ED paints.

Comparative CEDSABP 1 was prepared by slowly adding 600 parts distilled water to 200 parts Comparative Coating Resin A to form a dispersion. To 398.2 parts of the dispersion were added with stirring 77.6 parts Film-Former Dispersion A, 93.2 parts Pigment Dispersion A, and 431 parts distilled water.

Comparative CEDSABP 1 was cathodically electrophoretically applied to phosphoric acid-anodized bare aluminum. When heated for 2 hours at 171° C., the coating was not MEK-resistant. This is believed to have been due to the absence of a nitrogen atom in the L or T moiety. The coating could be cured to an MEK-resistant state by heating for two hours at 176° C. followed by 0.5 hour at 232° C. However, a 232° C. cure cycle typically is regarded as unsuitable for aluminum, particularly in aircraft applications.

COMPARATIVE EXAMPLE 2

This comparative example illustrates an attempt to prepare a CEDSABP using a coating resin that lacked an L moiety.

Comparative CEDSABP 2 was prepared by slowly adding 341.7 parts distilled water to 487.5 parts Comparative Coating Resin B to form a dispersion. To the dispersion were added with stirring 77.6 parts Film-Former Dispersion A and 93.2 parts Pigment Dispersion A.

An attempt was made to carry out cathodic electrophoretic deposition of Comparative CEDSABP 2 on phosphoric acid-anodized bare aluminum. A large current draw was observed but no coating was obtained. This is believed to have been due to the absence of an L moiety.

COMPARATIVE EXAMPLE 3

This comparative example illustrates the $T_g$ enhancement provided by a relatively bulky linking compound that has been referred to in several patents relating to ED paints. 72.7 Parts EPON 829 and 14.8 parts 1,5-dihydroxynaphthalene were combined neat and reacted overnight at 158° C., then diluted with 28.9 parts mixed xylenes. The resulting dark brown, viscous reaction product solution contained 72.5% solids and had an epoxy equivalent weight of 423 (perchloric acid-tetrabutyl ammonium iodide titration). 19.06 Parts of the reaction product solution were combined with 0.30 parts piperidine and 54.6 parts of xylene:methylene chloride solution, then analyzed using dynamic mechanical analysis. A measured $T_g$ of 134° C. was obtained. This $T_g$ value is 20° C. greater than that obtained when bisphenol A is substituted for such linking compound.

Various modifications and alterations of this invention will become apparent to those skilled in the art without departing from the scope and spirit of this invention. It should be understood that this invention is not limited to the illustrative embodiments set forth herein.

I claim:

1. A water-compatible resin having a substantially linear structure and water-solubilizing groups, the resin having a backbone derived from reaction between a polyepoxide and an aryl or cycloalkyl linking compound having a plurality of epoxide-reactive groups, said linking compound having a sufficiently bulky structure that is sufficiently Tg enhancing to raise by more than 20° C. the Tg of a first cured epoxy resin that has been (a) made from the reaction product obtained by combining DGEBA and said linking compound at a 1.05:1 ratio of moles of said DGEBA to moles of said epoxide-reactive groups in said linking compound, (b) cured using piperidine at a 9.08:1 ratio of moles of epoxy groups in said reaction product to moles of said piperidine, and (c) analyzed using dynamic mechanical analysis, when compared to the Tg of a second cured epoxy resin made and cured similarly but using bisphenol A in place of said linking compound.

2. A water-compatible resin according to claim 1, having a substantially linear structure of the formula:

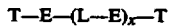

wherein:
each E is independently a residue of a diepoxide;
each L is independently a residue of said aryl or cycloalkyl linking compound, said linking compound having an average of two of said epoxide-reactive groups;
each T is independently a water-solubilizing moiety; and
x has a sufficiently low value so that said resin will be water-dispersible at a level of at least about 1% solids of said resin in water.

3. A water-compatible resin according to claim 1, having a substantially linear structure of the formula:

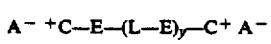

wherein:
each E is independently a residue of a diepoxide;
each L is independently a residue of said aryl or cycloalkyl linking compound, said linking compound having an average of two of said epoxide-reactive groups;
each C is independently a cationic water-compatible ammonium, sulfonium or phosphonium group;
each A is independently the conjugate base of a water-soluble acid HA having a $pK_a$ for use under cathodic electrodeposition conditions; and
y has an average value of about 1 to about 20.

4. A resin according to claim 3, wherein said epoxide-reactive groups of said linking compound are independently selected from amine, phenol, mercaptan and carboxyl groups.

5. A coated metallic article, having on at least a portion of its surface a cured coating, said coating being derived from a resin according to claim 3.

6. A resin according to claim 3, wherein L is crossplanar.

7. A resin according to claim 6, wherein said epoxide-reactive groups in said linking compound are attached through unsubstituted or substituted arylene radicals to a ring atom in the remainder of said linking compound.

8. A resin according to claim 7, wherein said $T_g$ of said first cured epoxy resin exceeds by at least 50° C. said $T_g$ of said second cured epoxy resin.

9. A resin according to claim 3, wherein L comprises a residue of a di(secondary)amine, diphenol or dithiol.

10. A resin according to claim 1, wherein said linking compound comprises a residue of a 9,9-bis(N-alkylaminophenyl)fluorene.

11. A resin according to claim 1, wherein said $T_g$ of said first cured epoxy resin exceeds by at least 30° C. said $T_g$ of said second cured epoxy resin.

12. A cathodically electrophoretically depositable coating composition comprising
(a) water-compatible resin having a substantially linear structure of the formula:

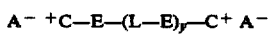

wherein:
each E is independently a residue of a diepoxide;
each L is indepenently a residue of an aryl or cycloalkyl linking compound having an average of two epoxide-reactive groups and a sufficiently bulky structure that is sufficiently Tg enhancing to raise by more than 20° C. the Tg of a first cured epoxy resin that has been (i) made from the reaction product obtained by combining DGEBA and said linking compound at a 2.1:1 ratio of moles of said DGEBA to moles of said linking compound, (ii) cured using piperidine at a 9.08:1 ratio of moles of epoxy groups in said reaction product to moles of said piperidine, and (iii) analyzed using dynamic mechanical analysis, when compared to the Tg of a second cured epoxy resin made and cured similarly but using bisphenol A in place of said linking compound;
each C is independently a cationic water-compatible ammonium, sulfonium or phosphonium group;
each A is independently the conjugate base of a water-soluble acid HA having a $pK_a$ for use under cathodic electrodeposition conditions; and y has an average value of about 1 to about 20; with the proviso that said resin contains a nitrogen atom;

(b) bis-maleimide crosslinking film-former and/or crosslinking pigment;

(c) water; and (d) resin solvent and/or coalescing solvent.

13. A composition according to claim 12, wherein said linking compound is cross-planar.

14. A composition according to claim 13, wherein said epoxide-reactive groups in said linking compound are attached through unsubstituted or substituted arylene radicals to a ring atom in the remainder of said linking compound, and L comprises a residue of a di(-secondary)amine, diphenol or dithiol.

15. A composition according to claim 12, wherein L comprises a residue of a 9,9-bis(N-alkylaminophenyl)-fluorene.

16. A composition according to claim 12, containing barium chromate, lead chromate, or mixtures thereof as said pigment.

17. A composition according to claim 12, containing about 20 to about 50% by weight of said film-former, zero to about 40% by weight of said pigment, up to about 100% by weight of said resin solvent, and up to about 50% by weight of said coalescing solvent, all based upon the weight of said resin.

18. A composition according to claim 12, in the form of a film on an aluminum substrate, said film being curable at a temperature of about 176° C. or less with a curing time of about 2 hours or less, to provide a cured primer film that is not perceptibly removed by 100 double rubs with a piece of cheesecloth soaked in methyl ethyl ketone.

* * * * *

UNITED STATES PATENT AND TRADEMARK OFFICE
CERTIFICATE OF CORRECTION

PATENT NO. : 4,913,968

DATED : APRIL 3, 1990

INVENTOR(S) : POCIUS

It is certified that error appears in the above-identified patent and that said Letters Patent is hereby corrected as shown below:

Column 4, lines 27-28, "3,4-epoxycyclohexylmethyl3,4-epoxycyclohexanecarboxylate" should be —3,4-epoxycyclohexylmethyl-3,4-epoxycyclohexanecarboxylate—.

Column 6, line 68, "jackson" should be —Jackson—.

Column 7, line 52, "fo" should be —of—.

Column 21, line 10, "MIBD$^{(3)}$" should be —MIBK$^{(3)}$—.

Column 26, line 47, "indepenently" should be —independently—.

Signed and Sealed this

Thirtieth Day of July, 1991

Attest:

HARRY F. MANBECK, JR.

*Attesting Officer*  *Commissioner of Patents and Trademarks*